United States Patent [19]
Garkisch et al.

[11] 3,865,849
[45] Feb. 11, 1975

[54] A PROCESS FOR OBTAINING HIGH-PURITY MALEIC ANHYDRIDE FROM CRUDE MALEIC ANHYDRIDE

[75] Inventors: Otto Ludwig Garkisch, Neuenhain; Günther Ibing, Gladbeck; Günther Kammholz, Gelsenkirchen-Buer; Hermann Schirrmacher, Gladbeck; Kurt Lohbeck, Bottrop, all of Germany

[73] Assignees: Verba-Chemie AG, Gelsenkirchen-Buer; Metallgesellschaft AG, Frankfurt am Main, both of, Germany; part interest to each

[22] Filed: Dec. 13, 1971

[21] Appl. No.: 207,025

[30] Foreign Application Priority Data
Dec. 12, 1970  Germany............................ 2061335

[52] U.S. Cl. ........................................ 260/346.8 M
[51] Int. Cl. ............................................ C07c 57/14
[58] Field of Search ............................ 260/346.8 M

[56] References Cited
UNITED STATES PATENTS
2,340,490  2/1944  Porter ............................... 260/346.8
3,169,976  2/1965  Friedrichsen et al. ........... 260/346.8

Primary Examiner—Henry R. Jiles
Assistant Examiner—Bernard I. Dentz
Attorney, Agent, or Firm—Karl F. Ross; Herbert Dubno

[57] ABSTRACT

High-purity maleic anhydride is derived from a crude mixture as produced by oxidation of benzene or $C_4$ hydrocarbons and containing the maleic anhydride to be recovered. The process is carried out in at least two stages in the first of which the maleic acid in the mixture is decomposed by heat into maleic anhydride and water and a forerun is separated, and in the second of which maleic anhydride is continuously distilled from the sump product obtained from the first step.

5 Claims, 1 Drawing Figure

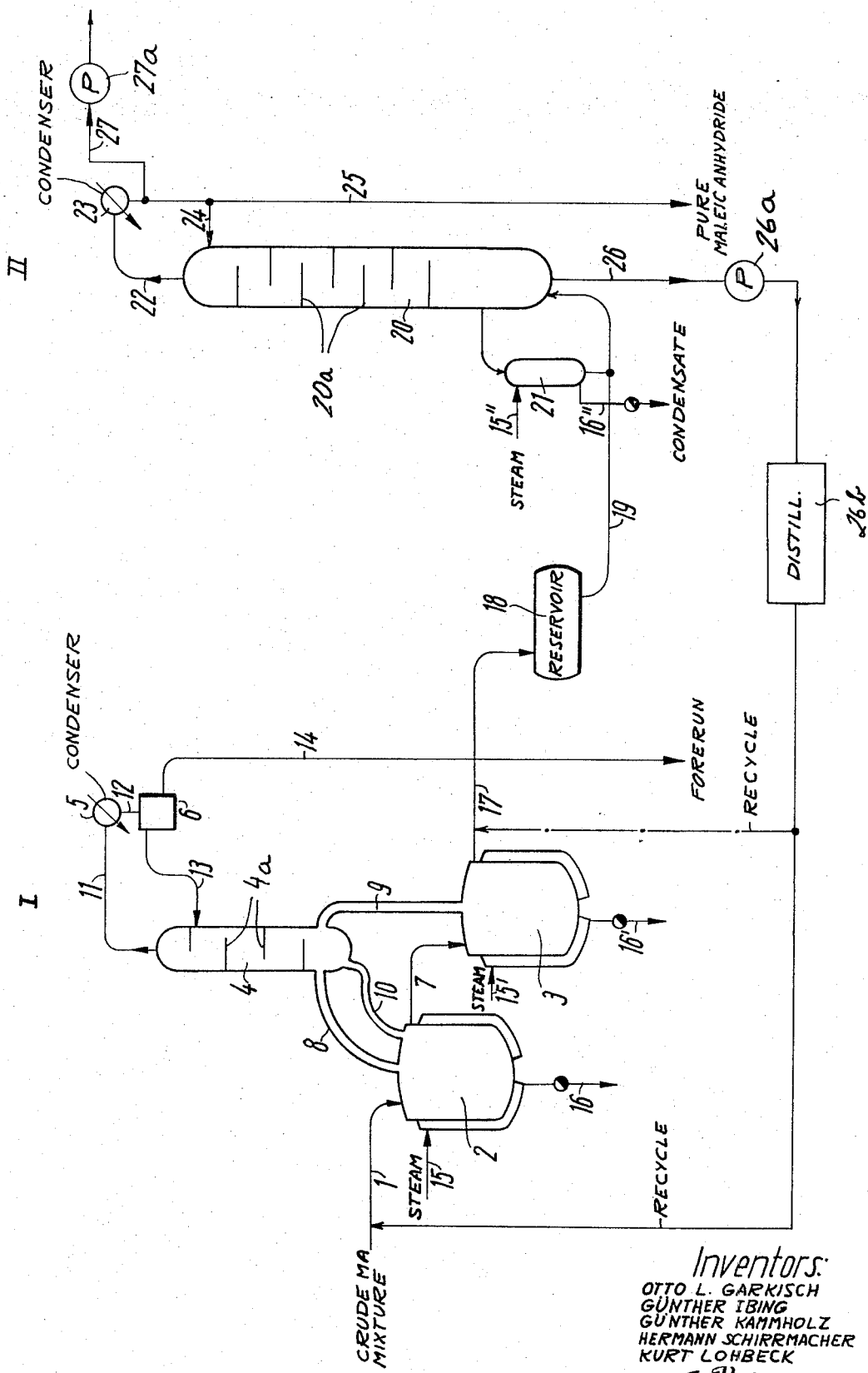

A PROCESS FOR OBTAINING HIGH-PURITY MALEIC ANHYDRIDE FROM CRUDE MALEIC ANHYDRIDE

FIELD OF THE INVENTION

Our present invention relates to the obtention of high-purity maleic anhydride from crude mixtures containing same, generally in the absence of an entrainer, and obtained from the oxidation of benzene or $C_4$ hydrocarbons.

BACKGROUND OF THE INVENTION

Maleic anhydride, which is commonly used in the synthesis of dienes by the Diels-Alder reaction, for copolymerization in the production of alkyd resins, and for the manufacture of industrial and agricultural chemicals including Malathion, has been produced on a commercial scale heretofore by a vapor-phase oxidation of benzene or $C_4$ hydrocarbons.

The maleic anhydride produced in the above manner can be the product of direct condensation (liquefaction) of the gases effluent from the vapor phase or the dehydration product of an aqueous solution of maleic acid produced by scrubbing the gases from which the maleic anhydride was originally condensed. In either case, the mixture consists of maleic anhydride, some residual maleic acid and various low-boiling-point impurities and high-boiling-point residues. The attempts to obtain high purity maleic anhydride from such mixtures have been complicated by the tendency toward formation of fumaric acid by a rearrangement of maleic acid. In general, the conventional purification processes are carried out discontinuously by heating the crude mixture containing maleic anhydride for prolonged periods. Water and low-boiling-point organic impurities are distilled off (evaporated) while the residue consisting of a maleic anhydride component can be distilled. To the best of our knowledge, even the latter process could be effected only with the aid of an azeotropic entrainer which was driven off during the discontinuous heating process mentioned earlier. It was neither possible nor desirable to carry out the process by continuous heating, simply because the steric rearrangement of maleic acid to fumaric acid and the formation of resinous residues prevented the process from being carried out in bulk, contaminated the apparatus in which the purification was attempted and otherwise interfered with the efficient purification of the maleic anhydride. Furthermore, the maleic anhydride transformation represents a loss of maleic acid from the system and hence a reduced yield on the starting materials and a reduction of efficiency.

In short, the discontinuous process results in a conversion of substantially all of the maleic acid in the crude mixture to fumaric acid with consequent loss of maleic anhydride and the generation of large quantities of recoverable fumaric acid and resinous constituents. The discontinuous process can therefore be carried out only in small plants with poor economy.

OBJECTS OF THE INVENTION

It is an important object of the present invention to provide an improved method of purifying a crude mixture containing maleic anhydride to provide a high-purity maleic anhydride in an economical and efficient manner.

Another object of the invention is to provide a system for purifying crude maleic anhydride which overcomes the disadvantages of the discontinuous methods mentioned earlier.

Still another object of the invention is the provision of a process for obtaining high-purity maleic anhydride from a mixture of maleic anhydride, maleic acid and other organic impurities in which encrustation of the apparatus can be avoided and the problem of fumaric acid production is eliminated or rendered insignificant.

Finally, it is an object of the invention to provide a process of the character described which can be carried out on an industrial scale efficiently and with a minimum of problems arising from encrustation and the generation of fumaric acid.

SUMMARY OF THE INVENTION

These objects are attained, in accordance with the present invention, by a continuous process for the purification of a crude mixture of maleic anhydride and maleic acid which involves at least two steps, the first being a continuous heating step in which maleic acid is thermally decomposed into maleic anhydride and water while, in the second step, the maleic anhydride component is distilled and the pure maleic anhydride is recovered from the vapors above the distilling liquid. According to an important feature of this invention, the first run or forerunning of the first process step is discharged or separated from the balance of the mixture. This stage of the first step appears to greatly reduce the possibility of subsequent difficulties. Thus the present invention provides that, in the first step of the process, maleic anhydride is treated substantially in a batch-like manner with at least the forerun, produced in part by thermal decomposition of maleic acid to maleic anhydride and water, being discarded. Of course, in this stage any lower-boiling-point impurities are evaporated as well.

According to another feature of the invention, a higher pressure is used in the first step, i.e. the thermal breakdown of the maleic acid to maleic anhydride and water, than is used in the next step wherein the maleic anhydride is distilled in a continuous manner. The first step pressure ranges upwardly of 100 millimeters of mercury (mm Hg) and preferably is between 100 mm Hg and atmospheric pressure although superatmospheric pressures up to 5 atmospheres may be used depending upon the composition of the crude mixture. The second-stage pressure should be between 60 and 200 mm Hg.

According to still another feature of this invention, the first step, i.e. thermal decomposition of maleic acid into maleic anhydride and water, is carried out in a cascade with at least two steps in series. In the cascade, water is stripped from the mixture together with the low-boiling-point organic compounds as the forerun and is discharged from the system through a valve designed to provide selectively either refluxing or discharge of the forerunning. The cascade operates most effectively where a rising temperature gradient is provided in each stage and we prefer to provide means for recycling any maleic anhydride from the residue of the second stage to the first step of the present system or to the raw maleic anhydride introduced into the second step column.

The system described above has the advantage that a high-purity maleic anhydride can be attained without the use of a azeotropic entrainer and in a relatively simple and economical manner. Furthermore, the process can be carried out in large volumes and with a minimum interruption caused by deposits resinous residues. Finally, the losses of materials resulting from steric rearrangement of maleic acid to fumaric acid are minimized.

DESCRIPTION OF THE DRAWING

The above and other objects, features and advantages of the present invention will become more readily apparent from the following description, reference being made to the accompanying drawing in which the sole FIGURE is a flow diagram illustrating the invention.

SPECIFIC DESCRIPTION

In the drawing, the two operating steps of the process have been identified at I and II, the first step I being carried out with a cascade of jacketed vessels 2 and 3 having a common distillation column 4.

The crude maleic anhydride mixture is introduced via a conduit 1 to the vessel 2 and can overflow from this vessel via a conduit 7 into vessel 3 of the cascade. Vapor lines 8 and 9 connect the vessels 2 and 3 of the cascade to the base of the distillation column 4 whose stages 4a have been illustrated diagrammatically. A return tube 10 carries refluxing liquid back to the first-stage vessel 2. An outlet conduit 11 at the top of column 4 leads the gases evaporated therein to a condenser 5 and to a separator 6 having the configuration of a valve, the drain 12 from the condenser being connected to this valve. The valve is also connected to a refluxing conduit 13 as previously described and to a forerunning discharge pipe 14.

From the final-stage vessel 3 of the first step, the mixture, now free from water and low-boiling-point impurities and in which substantially all of the maleic acid has been transformed into maleic anhydride, is led via line 17 to a storage receptacle 18 from which a line 19 continuously draws the crude mixture and feeds it to the distillation column 20. The latter has a multiplicity of stages 20a and is provided with an outlet 26 at its sump from which the sump residue may be withdrawn by a pump 26a, distilled at 26b and recycled to conduit 1.

The column 20 is provided with a steam-heated reboiler 21 which is supplied with superheated steam via lines 15" while line 16" serves to remove condensate from the system. As shown for the first stage of the apparatus of the drawing, steam is supplied at 15 and 15' to heat the jackets of the vessels 2 and 3 and thereby bring these vessels to the proper temperature.

At its upper end, the column 20 is provided with a vapor outlet 22 leading to a condenser 23 from which pure maleic anhydride can be recovered at 25, another protion of the maleic anhydride can be refluxed as shown at 24 and a suction introduced into the system at line 27 by the suction pump 27a.

SPECIFIC EXAMPLES

EXAMPLE I

Using the apparatus illustrated in the drawing, the product of a vapor phase catalytic oxidation of benzene with air is treated to obtain pure maleic anhydride. The gaseous effluent of the vapor-phase oxidation process is subjected first to condensation to produce a crude maleic anhydride containing about 3 percent by weight maleic acid and amounting to approximately 50 percent by weight of the maleic anhydride contained in the effluent gases.

The gases from which the condensate was separated are then scrubbed with water in a scrubbing tower to produce a 40 percent aqueous solution of maleic acid. The 40 percent maleic-acid solution is dehydrated to produce maleic anhydride with a residue of about 3 percent by weight maleic acid. These two quantities of maleic anhydride produced by direct condensation and dehydration, respectively, are fed to the first stage 2 of the cascade represented at I in the drawing. The mixture then passes through the overflow conduit 7 into the second stage vessel 3, both vessels being heated with steam which is supplied via line 15 or 15' and drained via line 16 or 16'.

The residence time and temperature of the maleic anhydride mixture in the two vessels are selected so that the product past via line 17 into the reservoir 18 has a fuamric acid content which is less than 0.5 percent by weight. The column 4, vessels 2 and 3 and condenser 5 are operated at a pressure of 200 mm Hg while the temperature in vessels 2 and 3 is maintained at 160°C.

The rising vapors of column 4, consisting of water split from maleic anhydride and low-boiling point organic impurities, is discharged after condensation as the forerun. Maleic anhydride vapors are thereafter condensed at 5 and returned to the column 4, the maleic anhydride then passes via duct 10 to the first-stage vessel 2 in accordance with the usual reflection principles.

Then the product in the vessel 3 is substantially free from maleic acid and constitutes a crude maleic anhydride, it is supplied to the reservoir 18 and then fed continuously by the pump to the distillation column 20. The latter is heated by the reboiler 21 via steam introduced at 15", the condensate being discharged at 16". The vapors rising in the multistage distillation column 20 and drawn at 22 thereafter are substantially pure maleic anhydride a portion of which is refluxed to the column 20 via line 24. The vacuum pump or steam injector 27a maintains a pressure of about 60 mm Hg in the column 20. The pure maleic anhydride is drawn at 25 from the condensor 23. The residue recovered at 26 contains about 5 percent of the maleic anhydride introduced at 1 in the form of a sump product consisting of 20 percent by weight fumaric acid and high-boiling point resinous components, and 80 percent by weight of maleic acid. The major portion of the maleic acid is recovered by distillation at 26b in a squeeze-out flask or the like and returned to line 1.

EXAMPLE II

A hydrocarbon fraction containing about 75 percent by weight of butene-1 and butene-2, the balance being other $C_4$ hydrocarbons, is catalytically oxidized by air in the vapor phase to produce effluent gases containing maleic anhydride. Condensation yields a product containing about 50 percent by weight of the maleic anhydride of the gas, contaminated with about 3 percent by weight of maleic acid. The balance of the maleic anhydride is hydrated in a scrubbing tower to maleic acid and is recovered from the tower in a 40 percent aqueous solution of the maleic acid. This solution is dehydrated to provide raw maleic anhydride contaminated with 2.5 percent by weight of maleic acid. The two maleic anhydride products are combined and fed through the cascade vessels 2 and 3 which are heated as previously described to a temperature of 160°C by steam and which are maintained under a pressure of 200 mm Hg, the residence time of the product in the stages of the first step being adjusted so that at most 0.5 percent fumaric acid is found in the mixture drawn via line 17 into the reservoir.

As described above, maleic acid is thermally decomposed to maleic anhydride and water, the latter being driven off together with the low-boiling point organic phase and being discharged as the forerun. Thereafter, maleic anhydride is refluxed in the system.

The mixture is then delivered to the distillation column 20 in which the maleic anhydride is evaporated, rises in the column, is condensed at 23 and partly refluxed at 24 and eventually is drawn off at 25. The distillation residue, amounting to about 5 percent by weight of the maleic anhydride introduced at 1, is recovered in the form of a mixture of fumaric acid and maleic anhydride. The latter is recovered and recycled to the first step. The reflux ratio, as in Example I, is about 0.4. The pressure in the column is about 60 mm Hg.

We claim:

1. A maleic anhydride purification method, comprising the steps of:
   a. deriving a crude maleic anhydride containing maleic acid as an impurity along with other organic impurities from the catalytic oxidation of benzene or $C_4$ hydrocarbons,
   b. heating said mixture to thermally decompose said maleic acid to maleic anhydride and water, while distilling off a forerun consisting of water and low-boiling point organic compounds, thereby producing a raw maleic anhydride and refluxing the maleic anhydride to form a residual mixture in two stages in cascade and at a pressure between 100 mm Hg and atmospheric pressure; and
   c. thereafter and at a later time than step (b) continuously distilling maleic anhydride from said residual mixture and producing a sump product containing principally maleic acid and fumaric acid at a pressure between 60 and 200 mm Hg, the pressure in the cascade stage being higher than that in step (c).

2. The method defined in claim 1, further comprising the step of controlling the temperature in said stages to maintain a rising-temperature gradient therein.

3. The method defined in claim 1, further comprising the step of separating maleic anhydride from said sump product and recycling same to the mixture introduced into step (b).

4. The method defined in claim 1, further comprising the step of separating maleic anhydride from said sump product and recycling the maleic anhydride thus separated to said raw maleic anhydride introduced into step (c).

5. The method defined in claim 1, further comprising the step of refluxing maleic anhydride during step (b) and controlling the temperature and residence time therein to maintain the fumaric acid concentration in said raw maleic anhydride below about 0.5 percent prior to the introduction of said raw maleic anhydride into step (c).

* * * * *